(12) United States Patent
Chang

(10) Patent No.: US 10,758,990 B1
(45) Date of Patent: Sep. 1, 2020

(54) TABLE SAW HAVING VISUALLY DIFFERENT SCALES

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 0 days.

(21) Appl. No.: 16/435,507

(22) Filed: Jun. 9, 2019

(51) Int. Cl.
| | |
|---|---|
| *B23D 47/04* | (2006.01) |
| *B23D 59/00* | (2006.01) |
| *B23D 47/02* | (2006.01) |
| *B23D 45/06* | (2006.01) |

(52) U.S. Cl.
CPC .......... *B23D 59/001* (2013.01); *B23D 45/06* (2013.01); *B23D 47/025* (2013.01)

(58) Field of Classification Search
CPC ......... B27B 27/00; B27B 27/02; B27B 27/04; B27B 27/06; B27B 27/08; B27B 27/10; B27B 5/16; B27B 5/181; B27B 5/22; B27B 5/222; B23D 47/025; B23D 47/04; B23D 47/045; B23D 59/001; B23D 45/06; B27G 19/02; Y10T 83/773; Y10T 83/727; Y10T 83/7647; Y10T 83/73; Y10T 83/732; Y10T 83/734; Y10T 83/7722; Y10T 83/7684; Y10T 83/7705
See application file for complete search history.

(56) References Cited

U.S. PATENT DOCUMENTS

| | | | | |
|---|---|---|---|---|
| 6,581,655 | B2 * | 6/2003 | Huang | B23D 47/025 144/287 |
| 7,191,692 | B2 * | 3/2007 | Huang | B23D 47/025 144/287 |
| 10,183,415 | B2 * | 1/2019 | Chang | B27B 27/10 |
| 10,335,974 | B2 * | 7/2019 | Chiang | B23D 47/025 |
| 2005/0204884 | A1 * | 9/2005 | Huang | B23D 47/025 83/477.2 |

* cited by examiner

*Primary Examiner* — Stephen Choi

(57) ABSTRACT

A scale assembly of a table saw includes a first positioning pin of white, a second positioning pin of black, and a third positioning pin of yellow disposed on the first slide strip of a slide mechanism; a first scale of white disposed on a top of the first slide strip; a second scale of black and a third scale of yellow disposed on a top of the first track respectively; a first pointer disposed on one end of the top of the first track and forwardly pointing to the first scale of white of the first slide strip; and a second pointer disposed on the other end of the top of the first slide strip and rearward pointing to both the second scale of black and the third scale. The scale is visible in a cutting operation.

5 Claims, 14 Drawing Sheets

TABLE SAW HAVING VISUALLY DIFFERENT SCALES

BACKGROUND OF THE INVENTION

1. Field of the Invention

The invention relates to table saws and more particularly to a table saw having a first scale of white, a second scale of black and a third scale of yellow; and a first positioning pin of white, a second positioning pin of black and a third positioning pin of yellow corresponding to the first, second and third scales respectively.

2. Description of Related Art

U.S. Pat. No. 10,183,415 to Chang, entitled "table saw", discloses a table saw comprising a table, a saw, a track, a slide strip, and a fence member. The table has an axial direction and a radial direction which are orthogonal to each other. The saw is arranged at a predetermined position of the table. The track is arranged at each side of the table. The slide strip is slidably engaged with the track. An outer surface of the slide strip opposite to the track has a first position part, a second position part, and a third position part. The first position part and the second position part are respectively arranged at two ends of the slide strip and the third position part is arranged at a center of the slide strip. The fence member is bridged on the table and secured to one of the first position part, the second position part, and the third position part.

Moreover, in the '415 patent in cutting the workpiece on the left of the saw of the table, the fence member is at the second position part. However, there is no scale for reference because there is no scale disposed in each of the track and the slide strip. In response to sliding the table to a position that the left side of the table is farther away from left sides of the slide assembly, on a front end of the table, two scales are disposed on a top of the track so that to the right the fence member is at the first position part and the third position part respectively. Thus, a user may use the scales as a reference in the cutting operation. Further, the user has to use another scale to measure width of the workpiece corresponding to the workpiece at the second position part. This is quite inconvenient.

Thus, the need for improvement still exists.

SUMMARY OF THE INVENTION

It is therefore one object of the invention to dispose a table saw comprising a base assembly; a table assembly mounted on the base assembly and including a table and a table saw blade; a slide mechanism mounted on the table assembly; a rip fence assembly moveably disposed at one of three positions on both sides of the table assembly; a first slide strip disposed at a front end of the slide mechanism and slidably corresponding to a first track on a front end of the table assembly; a first positioning pin of white, a second positioning pin of black, and a third positioning pin of yellow disposed on the first slide strip of the slide mechanism; a first scale of white disposed on a top of the first slide strip; a second scale of black and a third scale of yellow disposed on a top of the first track respectively; a first pointer disposed on one end of the top of the first track and forwardly pointing to the first scale of white of the first slide strip; a second pointer disposed on the other end of the top of the first slide strip and rearward pointing to both the second scale of black and the third scale; wherein when the rip fence assembly is at the first positioning pin of white, the first scale of white is visible in a cutting operation; wherein when the rip fence assembly is at the second positioning pin of black, the second scale of black is visible in the cutting operation; and wherein when the rip fence assembly is at the third positioning pin of yellow, the third scale of yellow is visible in the cutting operation.

The above and other objects, features and advantages of the invention will become apparent from the following detailed description taken with the accompanying drawings.

DETAILED DESCRIPTION OF THE INVENTION

Figure 1:
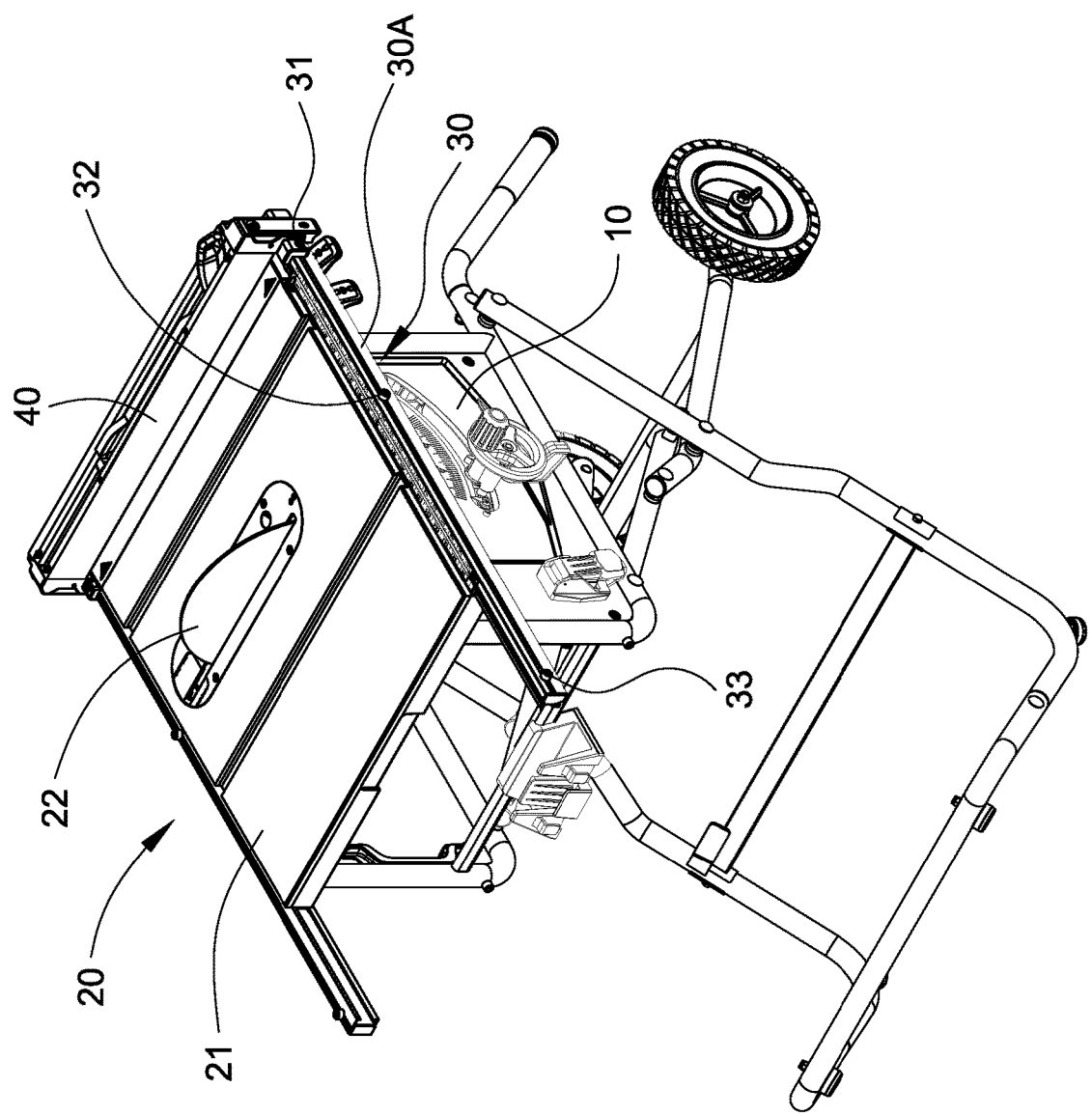
FIG. 1 is a perspective view of a table assembly and a base assembly of a table saw according to the invention.
Figure 2:
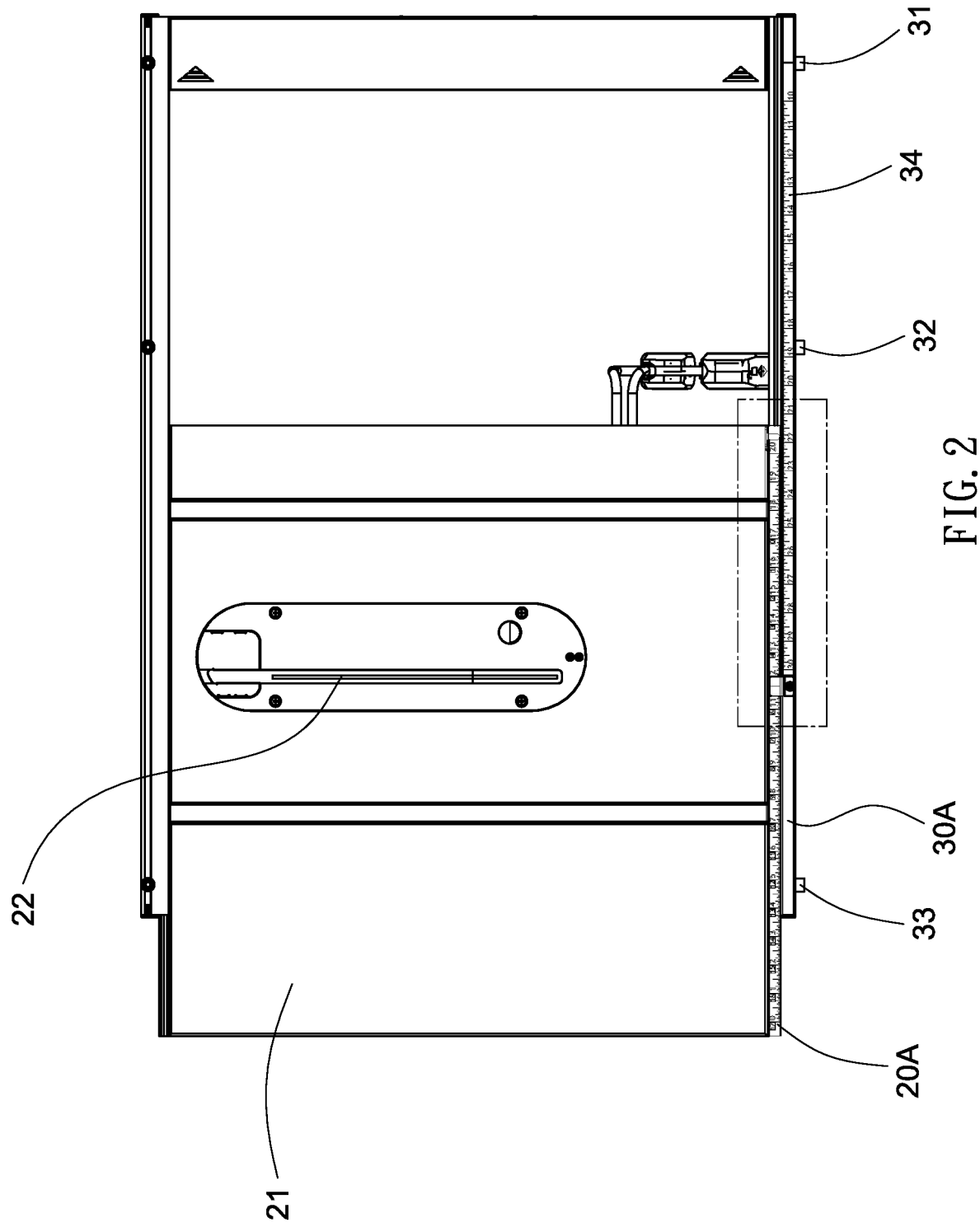
FIG. 2 is a top view of the table assembly.
Figure 3:
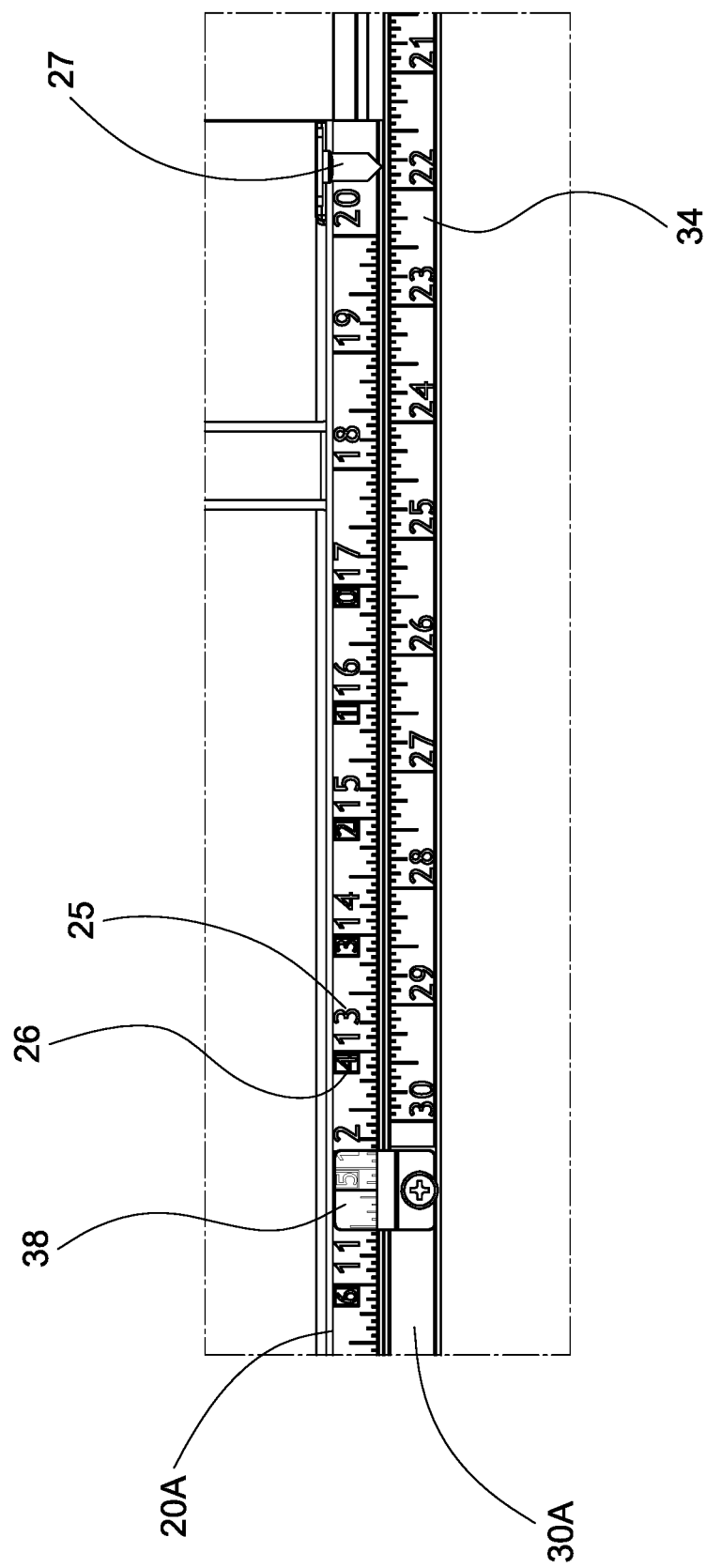
FIG. 3 is a detailed view of the area in a rectangle of FIG. 2.
Figure 4:
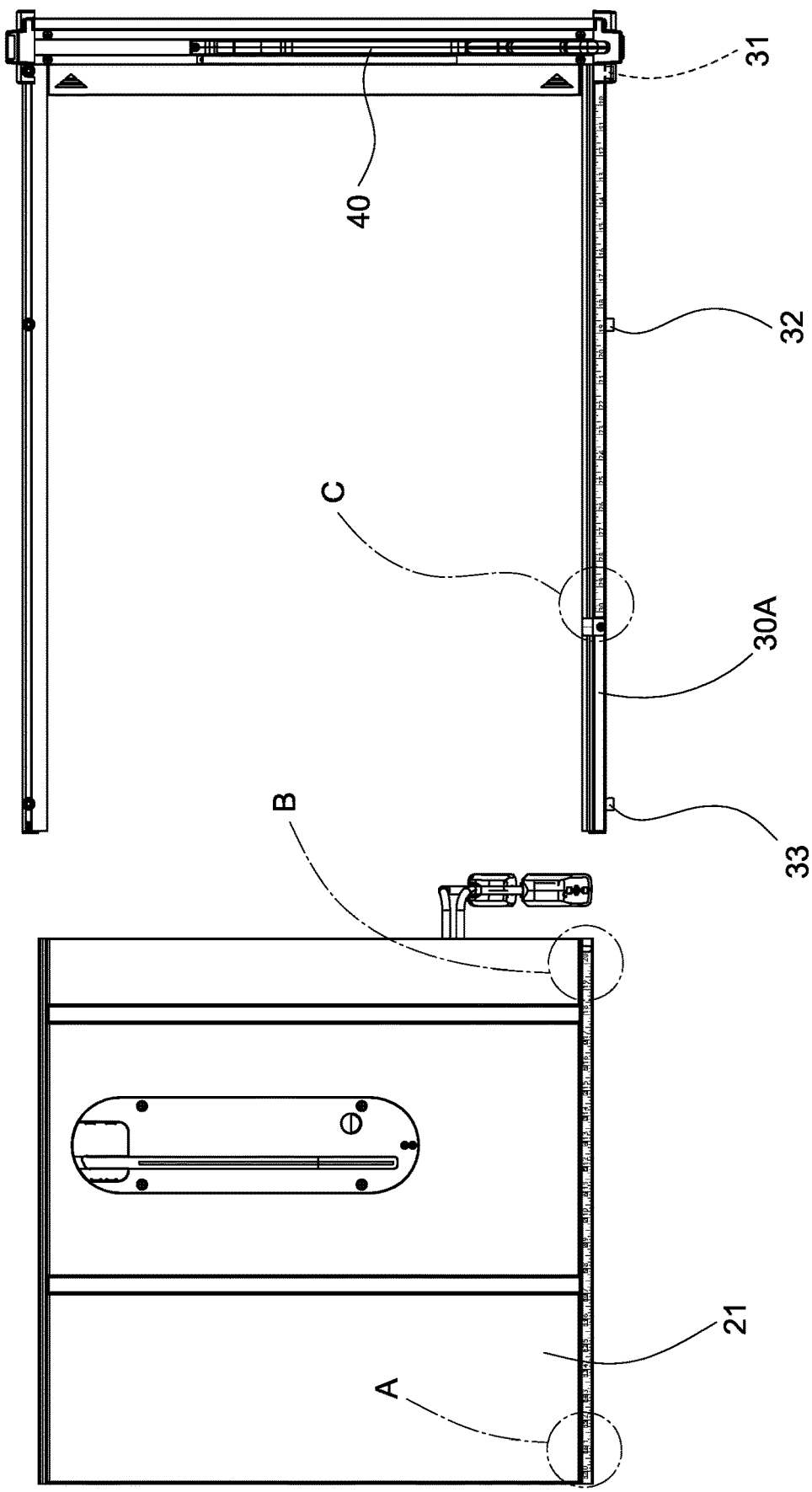
FIG. 4 is an exploded view of FIG. 2.
Figure 5:
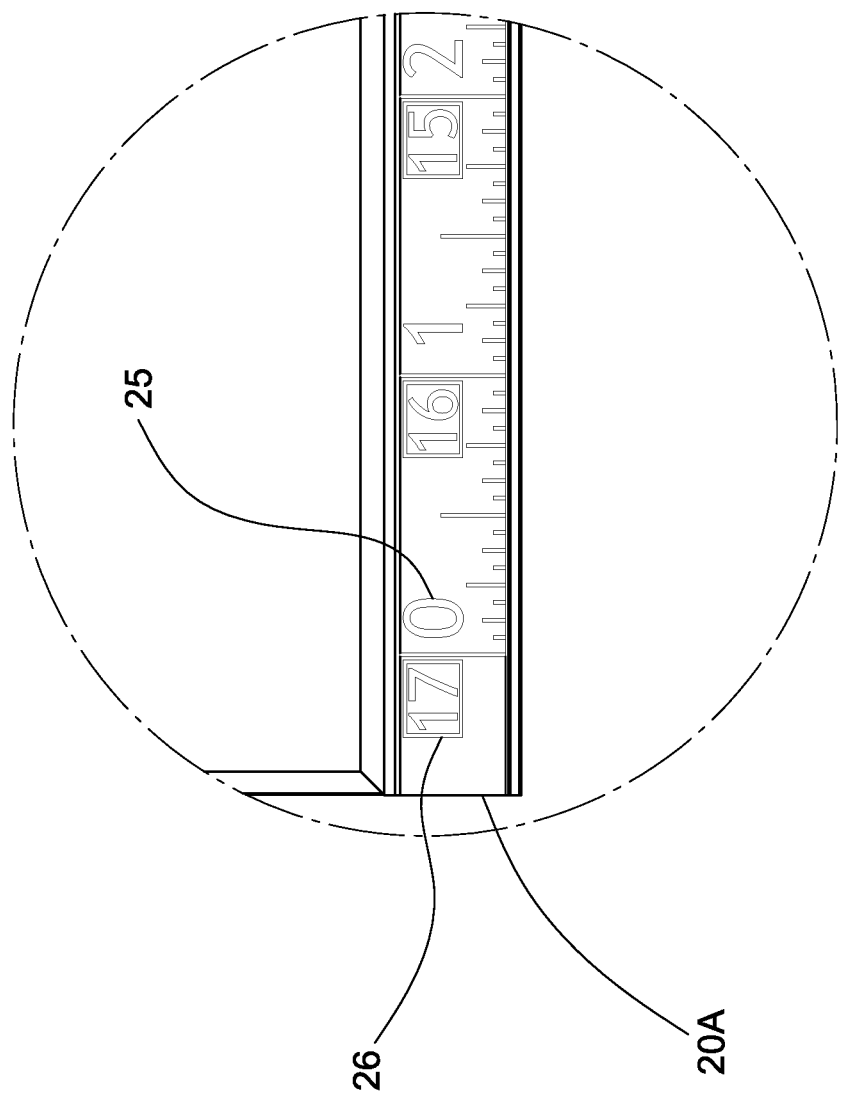
FIG. 5 is a detailed view of the area in a circle A of FIG. 4.
Figure 6:
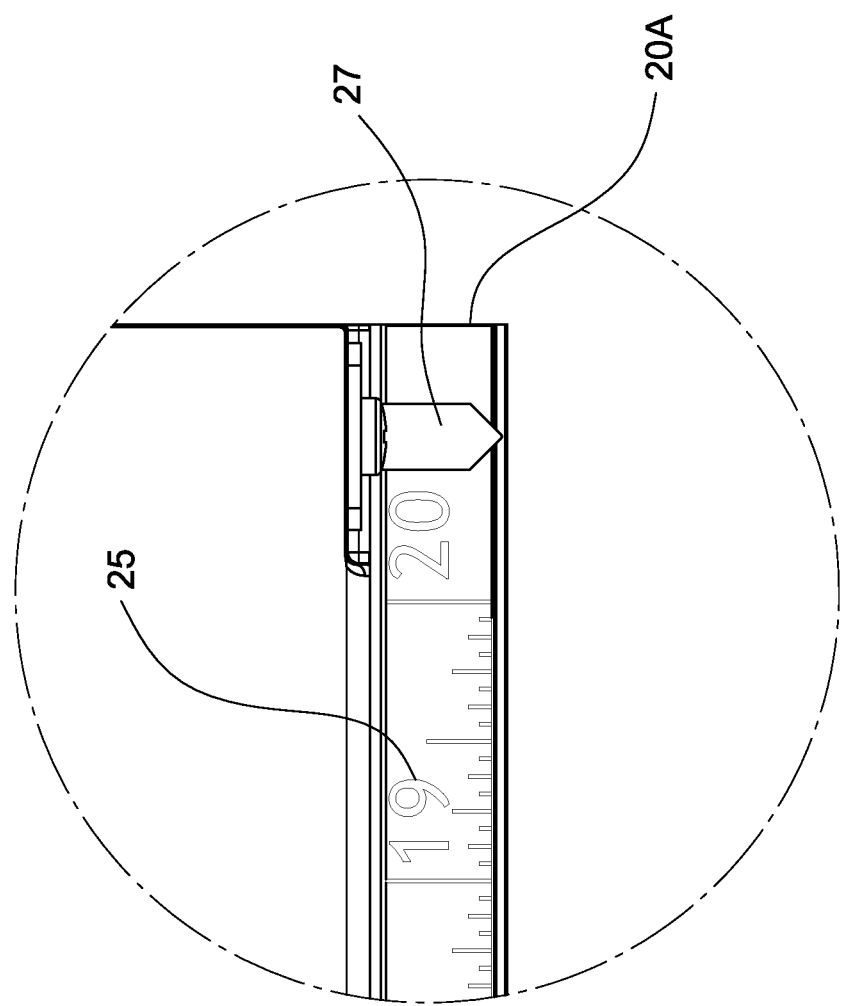
FIG. 6 is a detailed view of the area in a circle B of FIG. 4.
Figure 7:
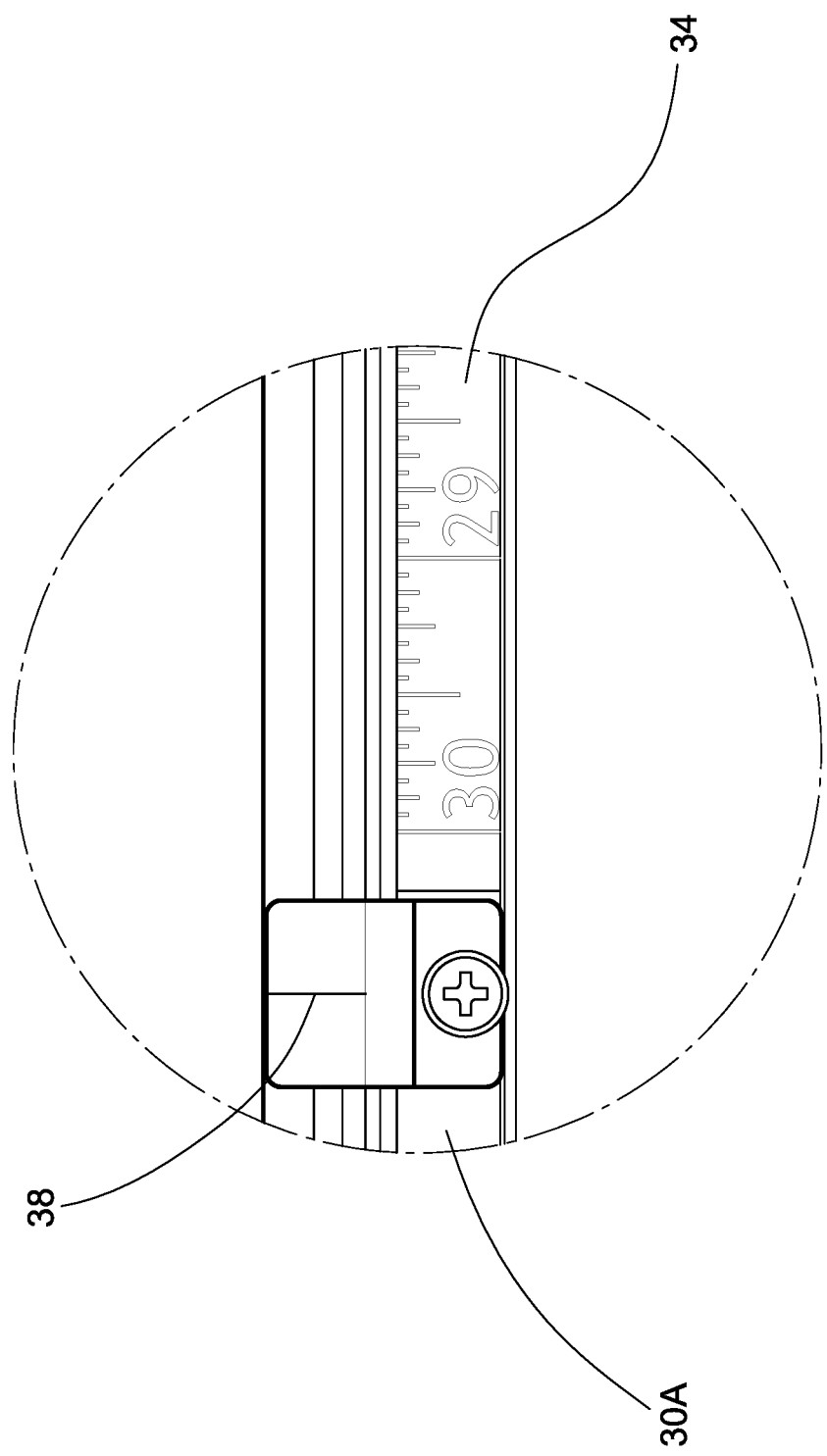
FIG. 7 is a detailed view of the area in a circle C of FIG. 4.
Figure 8:
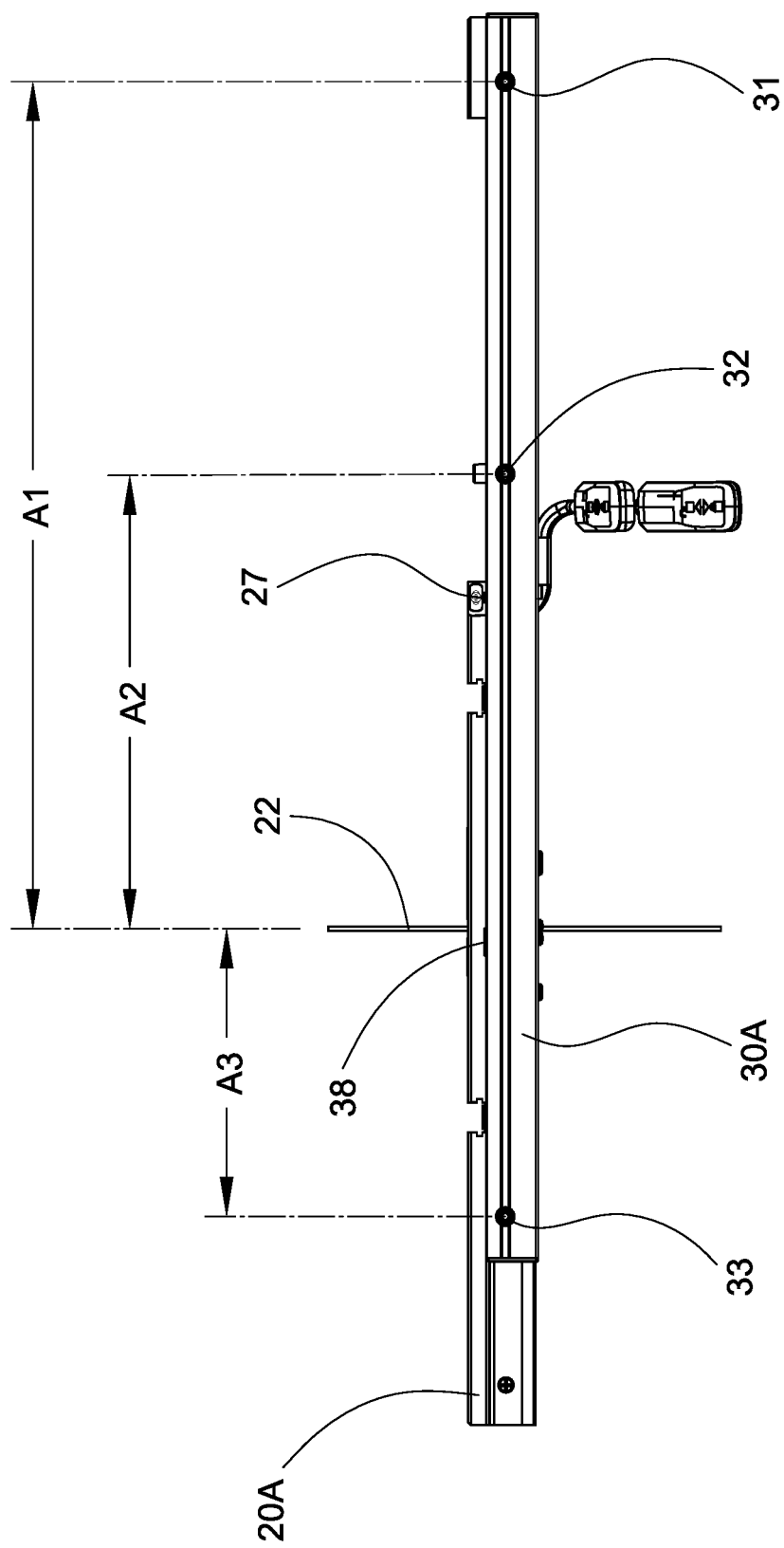
FIG. 8 is a side elevation view of FIG. 2.

Referring to FIGS. 1 to 14, a table saw in accordance with the invention comprises a base assembly 10, a table assembly 20 mounted on the base assembly 10 and including a table 21 and a table saw blade 22, a slide mechanism 30 mounted on the table assembly 20, and a rip fence assembly 40 moveably disposed at one of three positions on both sides of the table assembly 20.

A first slide strip 30A is disposed at a front end of the slide mechanism 30 and slidably corresponds to a first track 20A on a front end of the table assembly 20.

A scale assembly as the subject of the invention is discussed in detail below.

A first positioning pin 31 of white, a second positioning pin 32 of black, and a third positioning pin 33 of yellow are disposed on the first slide strip 30A of the slide mechanism 30. Correspondingly, a first scale 34 of white is disposed on a top of the first slide strip 30A. A second scale 25 of black and a third scale 26 of yellow are disposed on a top of the first track 20A respectively.

Figure 9:
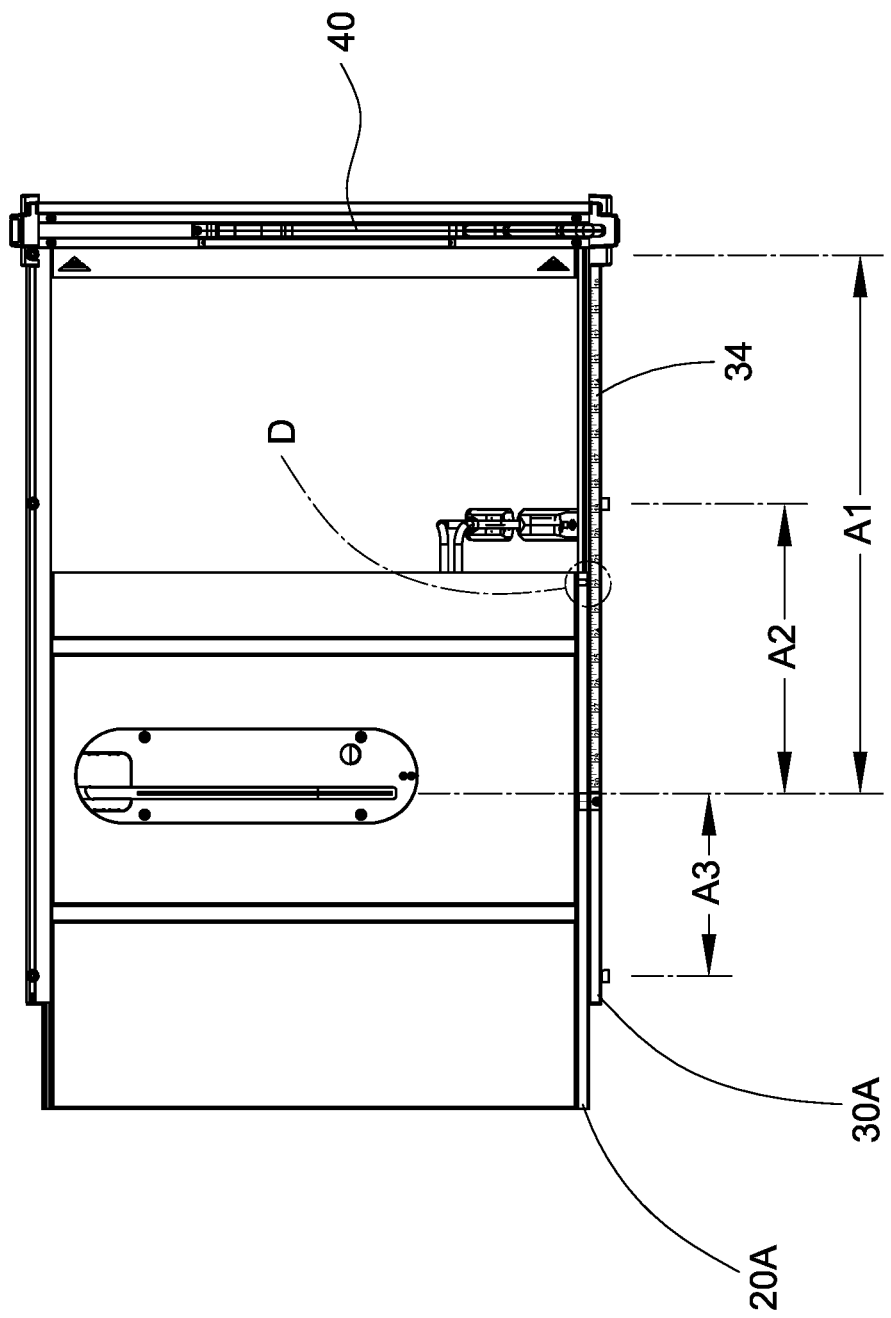
FIG. 9 is a view similar to FIG. 2 showing the first scale.
Figure 10:
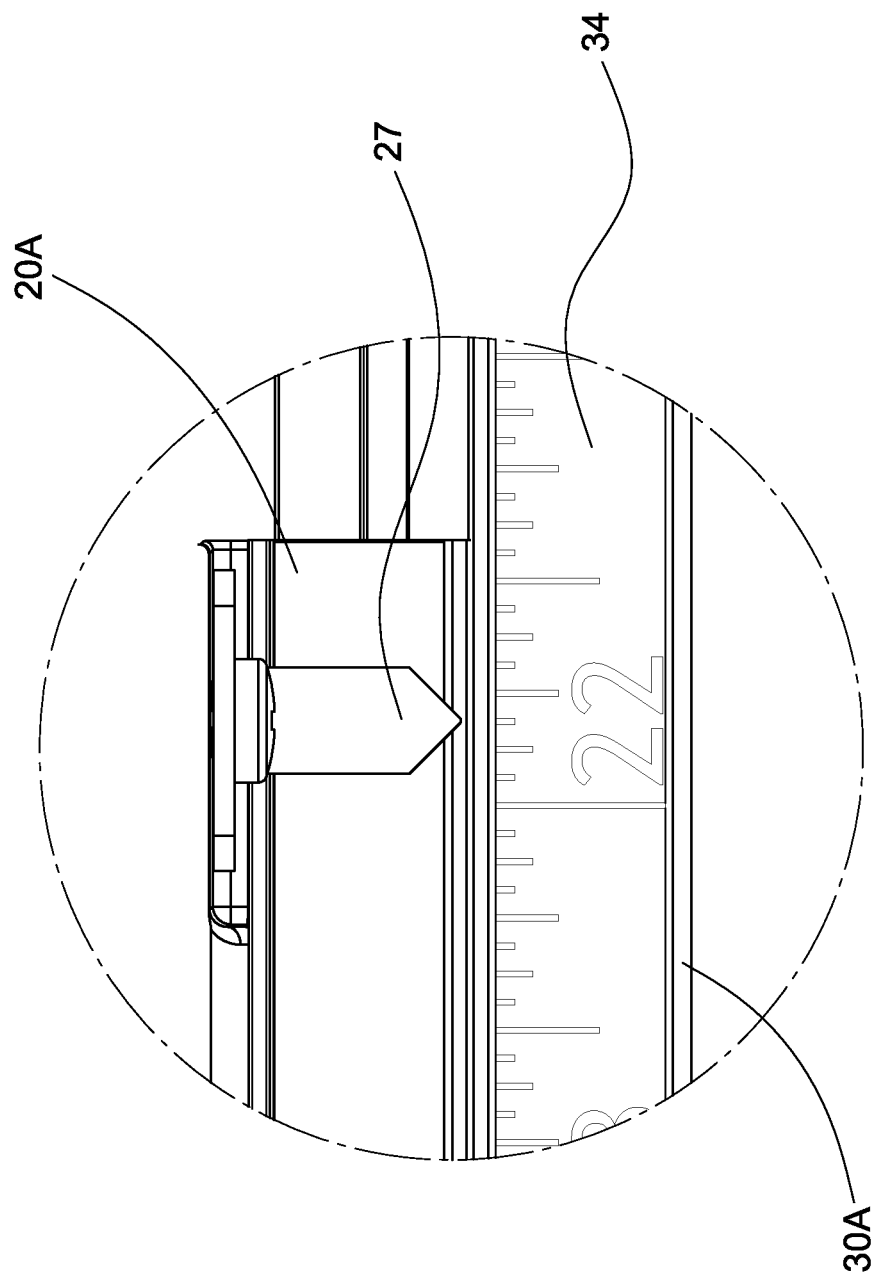
FIG. 10 is a detailed view of the area in a circle D of FIG. 9.
Figure 11:
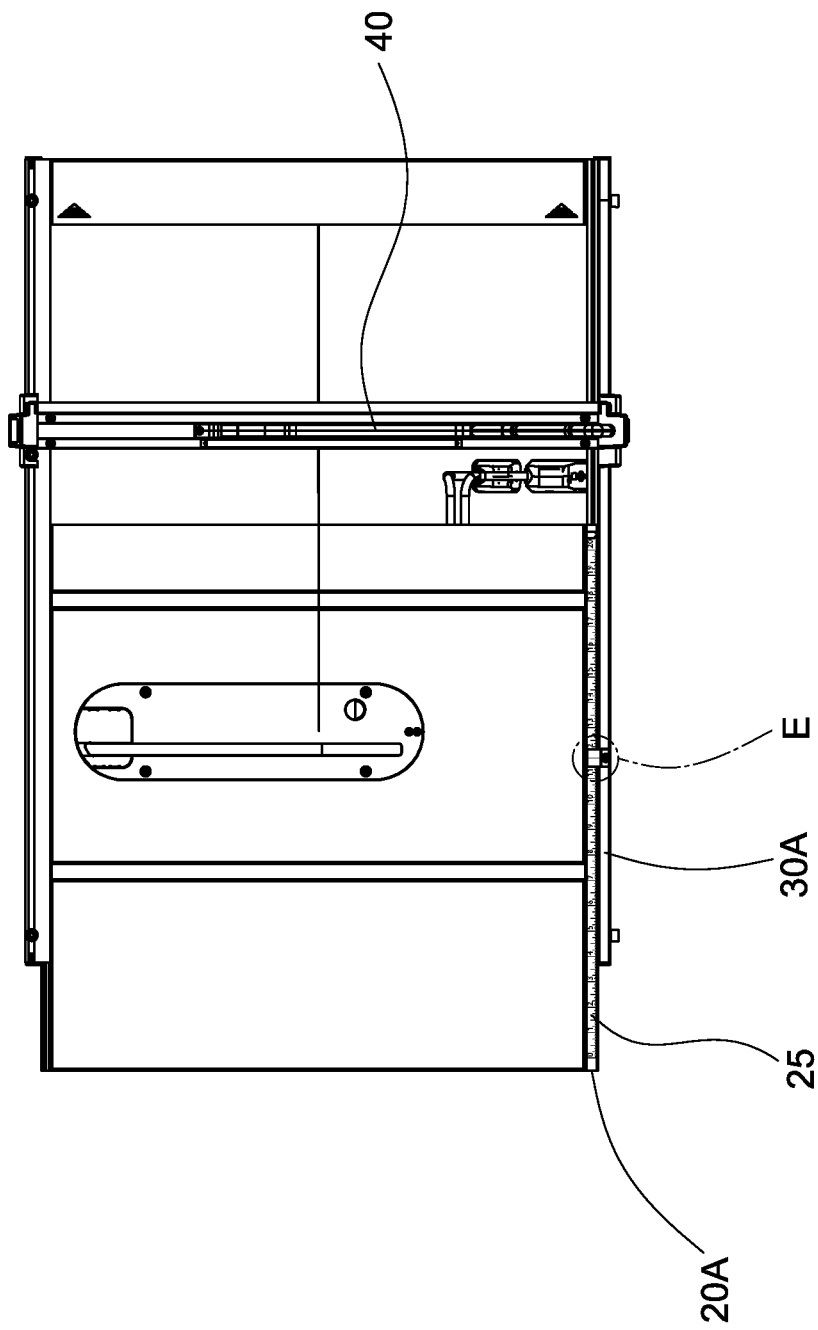
FIG. 11 is a view similar to FIG. 2 showing the second scale.
Figure 12:
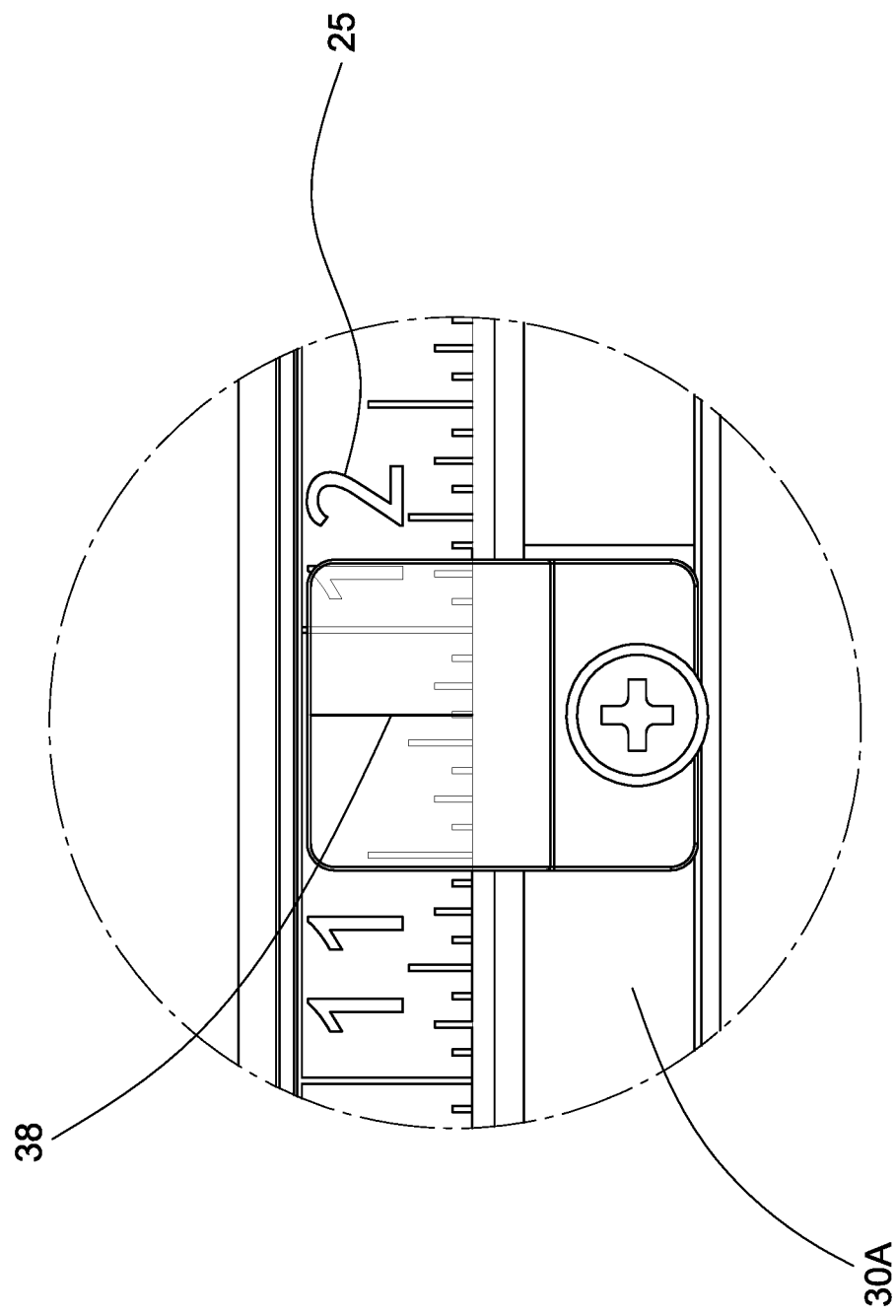
FIG. 12 is a detailed view of the area in a circle E of FIG. 11 showing the second scale with the third scale concealed.
Figure 13:
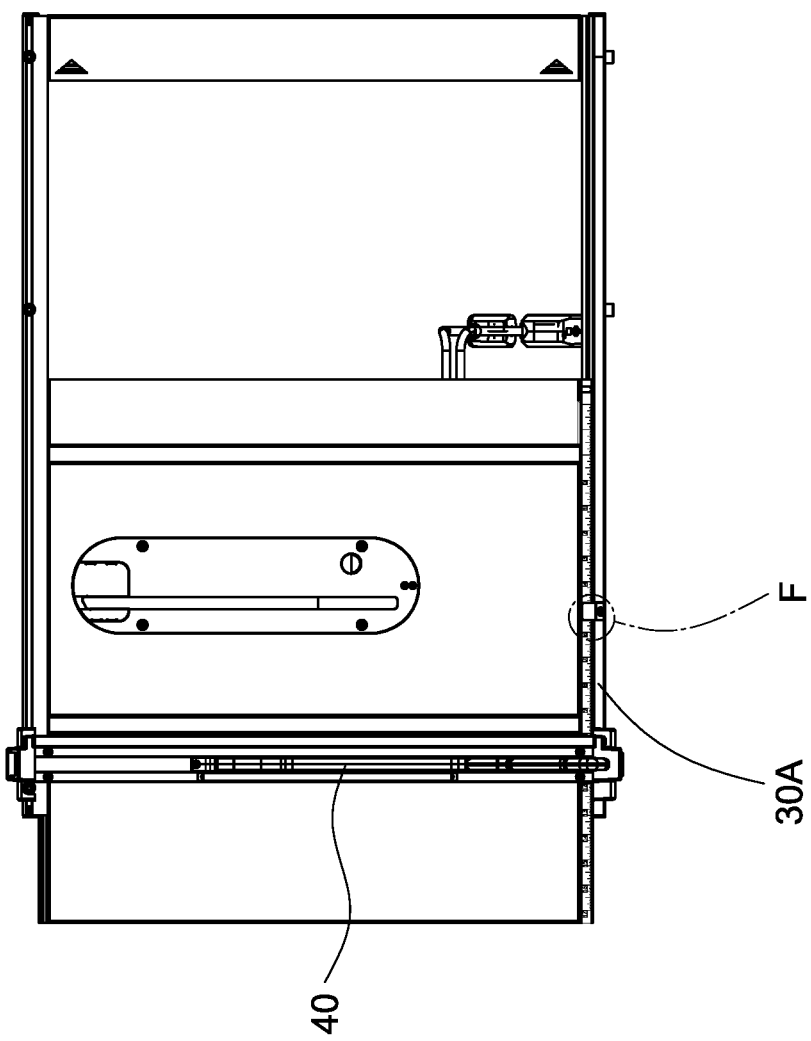
FIG. 13 is a view similar to FIG. 2 showing the third scale.
Figure 14:
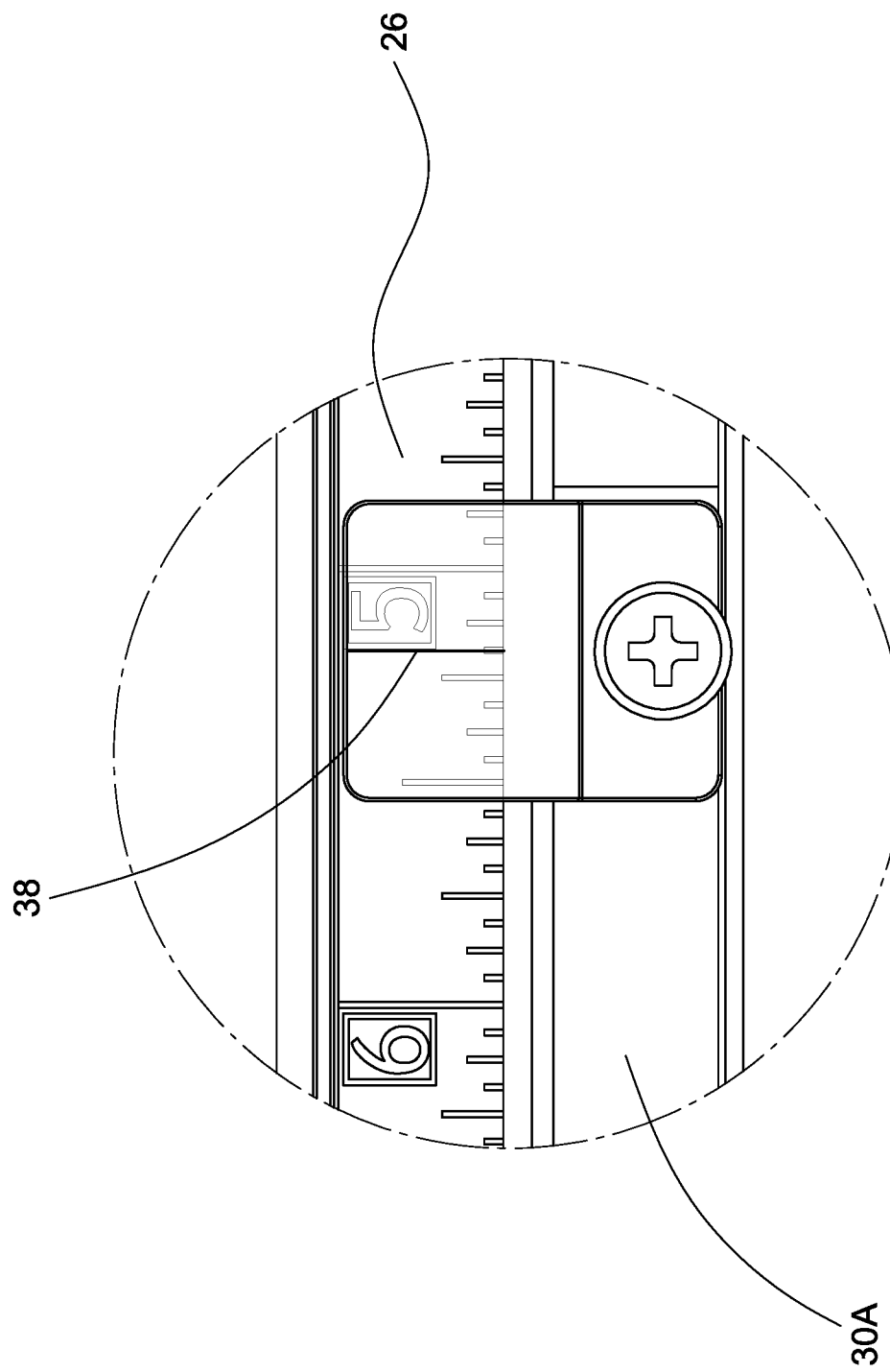
FIG. 14 is a detailed view of the area in a circle F of FIG. 13 showing the third scale with the second scale concealed.

A first pointer 27 is disposed on one end of the top of the first track 20A and forwardly points to the first scale 34 of white of the first slide strip 30A when the rip fence assembly 40 is at the first positioning pin 31 of white (see FIGS. 9 and 10).

A second pointer 38 is disposed on the other end of the top of the first slide strip 30A and rearward points to both the second scale 25 of black and the third scale 26 of yellow of the first track 20A.

Marks of the first scale 34 of white are gradually decreased from left to right in digits. When the rip fence assembly 40 is at the first positioning pin 31 of white, a user may see the first pointer 27 and the first scale 34 of white in a cutting operation so that it is possible of visually distinguishing the scales of different colors (see FIGS. 9 and 10).

Marks of the second scale 25 of black are gradually increased from left to right in digits. When the rip fence assembly 40 is at the second positioning pin 32 of black, the user may see the second pointer 38 and the second scale 25 of black in a cutting operation (see FIGS. 11 and 12).

Marks of the third scale 26 of yellow are gradually decreased from left to right in digits. When the rip fence assembly 40 is at the third positioning pin 33 of yellow, the user may see the second pointer 38 and the third scale 26 of yellow in a cutting operation (see FIGS. 13 and 14).

In addition to having scales of different colors, the marks (e.g., digits) may be of different fonts to further enable a user to distinguish the scales.

A1 is defined as a distance between the first positioning pin 31 of white and the table saw blade 22 in a cutting operation. A2 is defined as a distance between the second positioning pin 32 of black and the table saw blade 22 in a cutting operation. A3 is defined as a distance between the third positioning pin 33 of yellow and the table saw blade 22 in a cutting operation.

After positioning a workpiece (not shown) on the table 21, a user may slide the slide assembly 30 relative to the table 21 to measure a width of the workpiece by moving the corresponding first pointer 27 or the second pointer 38 in order to align with the edge of the workpiece.

Advantageously, it is envisaged by the invention that in this position the user may use at least one of three scales of different colors corresponding to one of three positioning pins of different colors respectively to measure the width of the workpiece so that it is possible of visually distinguishing the scales of different colors. This is a great improvement of the invention.

While the invention has been described in terms of preferred embodiments, those skilled in the art will recognize that the invention can be practiced with modifications within the spirit and scope of the appended claims.

What is claimed is:

1. A table saw, comprising:
   a base assembly;
   a table assembly mounted on the base assembly and including a table and a table saw blade;
   a slide mechanism mounted on the table assembly;
   a rip fence assembly moveably disposed at one of three positions on both sides of the table assembly;
   a first slide strip disposed at a front end of the slide mechanism and slidably corresponding to a first track on a front end of the table assembly;
   a first positioning pin of white, a second positioning pin of black, and a third positioning pin of yellow all disposed on the first slide strip of the slide mechanism;
   a first scale of white disposed on a top of the first slide strip;
   a second scale of black and a third scale of yellow disposed on a top of the first track respectively;
   a first pointer disposed on one end of the top of the first track and forwardly pointing to the first scale of white of the first slide strip; and
   a second pointer disposed on the other end of the top of the first slide strip and rearward pointing to both the second scale of black and the third scale of yellow;
   wherein the first pointer is used with the first scale of white when the rip fence assembly is at the first positioning pin of white for cutting a workpiece positioned against the rip fence assembly;
   wherein the second pointer is used with the second scale of black when the rip fence assembly is at the second positioning pin of black for cutting a workpiece positioned against the rip fence assembly; and
   wherein the second pointer is used with the third scale of yellow when the rip fence assembly is at the third positioning pin of yellow for cutting a workpiece positioned against the rip fence assembly.

2. The table saw of claim 1, wherein marks of the first scale of white are gradually decreased from left to right in digits.

3. The table saw of claim 1, wherein marks of the second scale of black are gradually increased from left to right in digits.

4. The table saw of claim 1, wherein marks of the third scale of yellow are gradually decreased from left to right in digits.

5. The table saw of claim 1, wherein marks of the first, second and third scales are digits of different fonts.

* * * * *